United States Patent
Cai et al.

(10) Patent No.: US 8,987,967 B2
(45) Date of Patent: Mar. 24, 2015

(54) CLAW-POLE MOTOR WITH PERMANENT MAGNET AND ELECTRICALLY EXCITING PARTS

(75) Inventors: Wei Cai, Beijing (CN); Liheng Wang, Beijing (CN)

(73) Assignee: Jing-Jin Electric Technologies (Beijing) Co., Ltd., Beijing (CN)

(*) Notice: Subject to any disclaimer, the term of this patent is extended or adjusted under 35 U.S.C. 154(b) by 397 days.

(21) Appl. No.: 13/318,646

(22) PCT Filed: May 12, 2009

(86) PCT No.: PCT/CN2009/000514
§ 371 (c)(1),
(2), (4) Date: Nov. 3, 2011

(87) PCT Pub. No.: WO2010/127469
PCT Pub. Date: Nov. 11, 2010

(65) Prior Publication Data
US 2012/0056502 A1    Mar. 8, 2012

(30) Foreign Application Priority Data
May 6, 2009   (CN) .......................... 2009 1 0135921

(51) Int. Cl.
*H02K 1/27*     (2006.01)
*H02K 21/04*    (2006.01)
*H02K 16/02*    (2006.01)

(52) U.S. Cl.
CPC .............. *H02K 21/044* (2013.01); *H02K 16/02* (2013.01)
USPC ................... 310/156.69; 310/156.66; 310/263

(58) Field of Classification Search
CPC ............................... H02K 1/27; H02K 1/2706
USPC ........... 310/257, 263, 154.02, 156.66, 156.69
See application file for complete search history.

(56) References Cited

U.S. PATENT DOCUMENTS 4,882,515 A * 11/1989 Radomski ...................... 310/263
6,433,457 B1 * 8/2002 Nakamura ...................... 310/263
(Continued)

FOREIGN PATENT DOCUMENTS

CN   2112224    *  8/1992   ............ H02K 19/16
CN   2277142      3/1998
(Continued)

OTHER PUBLICATIONS

Machine translation of CN2277142Y (published Mar. 1998, translated Oct. 2013).*
Machine translation of CN2112224 (Aug. 1992).*

*Primary Examiner* — Michael Andrews
(74) *Attorney, Agent, or Firm* — Boyle Fredrickson, S.C.

(57) ABSTRACT

An AC claw-pole electric motor includes a casing, a stator connected with the casing, a rotor and two exciting parts. The rotor includes a rotor shaft (9), a center magnetic yoke (11), a first side magnetic yoke (8), a second side magnetic yoke (13), and claw poles (2, 3, 4, 5) provided on the center magnetic yoke (11), the first side magnetic yoke (8) and the second side magnetic yoke (13). The two exciting parts are respectively provided in spaces formed by the center magnetic yoke (11), the first side magnetic yoke (8), the second side magnetic yoke (13) and the claw poles (2, 3, 4, 5). The axial exciting magnetic fluxes of the two exciting parts are opposite in direction. Thus, the main magnetic flux and the magnetic energy product of the electric motor are increased, and the output and the operation efficiency of the electric motor at a low speed are improved.

5 Claims, 6 Drawing Sheets (56) References Cited

U.S. PATENT DOCUMENTS 7,902,700 B1 *  3/2011  Gabrys ............... 310/156.83
2006/0192443 A1  8/2006  Rhyu et al.

FOREIGN PATENT DOCUMENTS

| CN | 2277142 Y * | 3/1998 | ............ H02K 1/27 |
| CN | 2354289 | 12/1999 | |

* cited by examiner

CLAW-POLE MOTOR WITH PERMANENT MAGNET AND ELECTRICALLY EXCITING PARTS

FIELD OF THE INVENTION

The present invention relates to an alternating current (AC) electric motor, and more particularly, to an AC claw-pole electric motor.

BACKGROUND OF THE INVENTION

At present, belt-driven starter generator (BSG) electric motors used in belt-driven start/stop mild hybrid systems of automobiles commonly adopt claw-pole electric motors for both driving and power generation. A claw-pole electric motor mainly consists of a casing, a stator iron core connected with the casing, claw poles adjacent to and alternate with each other, a rotor magnetic yoke, an excitation winding, a rotary shaft, a carbon brush, and a copper slip ring and so on. In the claw-pole electric motor, the main magnetic flux is generated only by electrical excitation of the excitation winding, which leads to a very low magnetic flux density in the air gap between the stator and the rotor of the electric motor; and there is serious magnetic leakage between the adjacent and alternate claw poles, which causes insufficient output of the electric motor when the driving system operates at a low speed.

SUMMARY OF THE INVENTION

In order to solve the aforesaid problem, the present invention provides an AC claw-pole electric motor of a novel structure. The main magnetic flux of the AC claw-pole electric motor is generated by an electrically excited magnetic field and permanent magnets or by two magnetic fields of permanent magnets together. This can increase the main magnetic flux and the magnetic energy product of the electric motor, and can significantly improve the output and the operation efficiency of the electric motor when the belt-driven start/stop mild hybrid system of an automobile operates at a low speed.

Specifically, the present invention provides an alternating current (AC) claw-pole electric motor, mainly consisting of a casing, a stator connected with the casing, a rotor and two exciting parts. The rotor comprises a rotor shaft, a center magnetic yoke, a first side magnetic yoke, a second side magnetic yoke, and claw poles provided on the center magnetic yoke, the first side magnetic yoke and the second side magnetic yoke. The two exciting parts are respectively provided in spaces formed by the center magnetic yoke, the first side magnetic yoke, the second side magnetic yoke and the claw poles, and axially excited magnetic fluxes of the two exciting parts are opposite in direction. The AC claw-pole electric motor provided by the present invention can increase the main magnetic flux and the magnetic energy product of the electric motor, and can significantly improve the output and the operation efficiency of the electric motor when the belt-driven start/stop mild hybrid system of an automobile operates at a low speed.

Furthermore, in an AC claw-pole electric motor according to an embodiment of the present invention, the permanent magnet may be encased by a non-magnetically permeable sleeve to further ease the requirements on mechanical strength of the permanent magnet. The permanent magnet exciting part and the electrically exciting part are located at the two sides of the center magnetic yoke respectively to result in a larger distance between the permanent magnet and the stator section than that in the prior art, so heat generated by the stator section has less influence on the permanent magnet exciting part. This reduces the risk of demagnetization of the permanent magnet and improves the thermal stability of the electric motor.

Moreover, in the hybrid-excitation AC claw-pole electric motor according to the embodiment of the present invention, the magnetic flux generated by the permanent magnet is shunted into two paths when there is no electrically excited magnetic field applied in the electric motor, one of which is self-closed after passing through relevant parts of the electric motor and the other one of which flows towards the stator iron core and generates a radial magnetic flux, i.e., the magnetic flux of the permanent magnet that generates the radial magnetic flux in the iron core is shunted so as to decrease the no-load back electromotive force of the electric motor and ease the volt-ampere requirements on power electronic controllers in the belt-driven start/stop mild hybrid system of an automobile.

DETAILED DESCRIPTION OF THE PREFERRED EMBODIMENT

Hereinbelow, the AC claw-pole electric motor according to embodiments of the present invention will be described with reference to the attached drawings.

Embodiment 1

Figure 1:
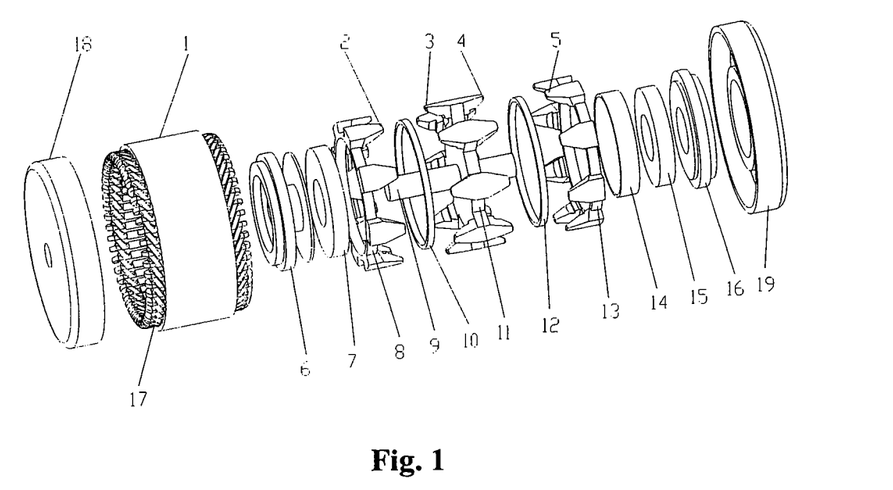
FIG. 1 is a schematic showing the exploded structural view of an AC claw-pole electric motor according to Embodiment 1 of the present invention.

As shown in FIG. 1, the AC claw-pole electric motor of the present invention mainly consists of three sections, namely, a stator section, a rotor section and an exciting part.

The stator section comprises a stator iron core 1 and three-phase windings 17 wound on laminates of the stator iron core 1.

The rotor section comprises: a center magnetic yoke 11, a first center claw pole 3 and a second center claw pole 4 located at edges of the center magnetic yoke 11, a rotor shaft 9 located at a center of and perpendicular to the center magnetic yoke 11, a first side magnetic yoke 8 located at one side of the center magnetic yoke 11, a first side claw pole 2 located at an edge of the first side magnetic yoke 8, a second side magnetic yoke 13 located at the other side of center magnetic yoke 11, and a second side claw pole 5 located at an edge of the second side magnetic yoke 13. Furthermore, the first center claw pole 3 and the first side claw pole 2 are adjacently and alternately fixed together by means of a stainless steel ring 10; and the second center claw pole 4 and the second side claw pole 5 are adjacently and alternately fixed together by means of a stainless steel ring 12. Existence of the claw poles makes the magnetic field in the air gap stabile so as to prevent occurrence of irreversible distortions. Use of the double claw poles can reduce radial dimensions of the electric motor, improve the magnetic characteristics of the permanent magnet and increase the production capacity of electric motors.

In this embodiment, the center magnetic yoke 11 is of a round-disc structure, and the first side magnetic yoke 8 and the second side magnetic yoke 13 are of a ring structure; the claw poles and the magnetic yokes are typically made of materials with superior magnetic permeability such as pure iron and #10 steel, or are made of steel sheets through stamping or are compression molded directly through powder metallurgy. The first side claw pole 2, the first center claw pole 3, the second center claw pole 4 and the second side claw pole 5 are key parts for transforming an axial magnetic field of the claw-pole electric motor into a radial magnetic field flowing into the stator side. Because the magnetic flux passes through each claw pole in an axial direction, the amount of magnetic flux passing through each cross section of the claw pole varies, the amount of magnetic flux passing through the claw tip is the least while most of the magnetic flux passes through the claw root. Accordingly, the cross section of each claw pole varies along the axial direction of the electric motor, with the claw tip having the smallest cross section and the claw root having the largest cross section. Each of the claw poles may be either formed integrally with its corresponding magnetic yoke or formed separately and then joined with the corresponding magnetic yoke. If the claw pole is formed separately and then joined with the corresponding magnetic yoke, it shall be ensured that the individual parts contact closely with each other; otherwise, the magnetic flux in the main magnetic circuit of the claw-pole electric motor would be seriously compromised to cause degradation in performance of the electric motor.

The rotor shaft 9 is a shaft made of a non-magnetically permeable material such as stainless steel, and is fixed at the center of the center magnetic yoke 11 perpendicularly.

In this embodiment, the first center claw pole 3 and the first side claw pole 2 are adjacently and alternately welded together by means of the stainless steel ring 10, and the second center claw pole 4 and the second side claw pole 5 are adjacently and alternately welded together by means of a stainless steel ring 12. In this way, the center magnetic yoke 11, the first center claw pole 3, the second center claw pole 4, the rotor shaft 9, the first side magnetic yoke 8, the first side claw pole 2, the second side magnetic yoke 13 and the second side claw pole 5 are connected together to form a whole claw-pole rotor, which greatly reduces the moment of inertia of the rotor and is beneficial to start the electric motor quickly.

The AC claw-pole electric motor of this embodiment is a brushless claw-pole electric motor, in which one of the two exciting parts adopts an electrically exciting part and the other one adopts a permanent magnet exciting part to form a hybrid excitation AC brushless claw-pole electric motor. As shown in FIG. 1, the electrically exciting iron core 6 is joined with an end cover 18 of the casing and the electrically exciting winding 7 is wound around the electrically exciting iron core 6. Thus, the electrically exciting part is fixed with respect to the stator section, and the electrically exciting winding 7 is accommodated in a space formed by the center magnetic yoke 11, the first side magnetic yoke 8, the first side claw pole 2 and the first center claw pole 3. A permanent magnet exciting iron core 16 is joined with an end cover 19 of the casing, and an annular permanent magnet 15 is joined with the permanent magnet exciting iron core 16 so that the permanent magnet exciting part is fixed with respect to the stator section. The annular permanent magnet 15 is accommodated in a space formed by the center magnetic yoke 11, the second side magnetic yoke 13, the second center claw pole 4 and the second side claw pole 5. This leads to a compact spatial arrangement and a high space utilization rate, and allows for increasing the effective length of the stator iron core of the electric motor; meanwhile, the permanent magnet in the permanent magnet exciting part is located away from the stator section to reduce the risk of demagnetization of the permanent magnet, so the thermal stability of the electric motor is improved. Additionally, a stainless steel sleeve 14 may sheathe on the outer periphery of the permanent magnet exciting part, for example, embedded into the permanent magnet exciting iron core 16 and abutting against outer periphery of the annular permanent magnet 15. The stainless steel sleeve 14 is used to secure the annular permanent magnet 15 against falling off of the annular permanent magnet 15 so as to enhance the robustness and reliability of the annular permanent magnet 15 under severe operation conditions of the electric motor and to further ease requirements on mechanical strength of the permanent magnet. Additionally, in order to improve the magnetic flux density of the air gap of the electric motor and the thermal stability of the magnet, the annular permanent magnet 15 may be made of an NdFeB permanent magnet material or other permanent magnet material.

The main magnetic flux of the AC brushless claw-pole electric motor of this embodiment is generated by the electrically excited magnetic field and the magnetic field of permanent magnet together. The directions of magnetic fluxes generated by the electrically exciting part and the permanent magnet exciting part are opposite to each other in the axial direction, and the magnetic fluxes flow respectively through two parallel magnetic circuits formed by the air gaps, the rotor and the stator.

In this embodiment, the directions of the two exciting magnetic fluxes are opposite to each other in the axial direction. Hence, with the original single-side electrically exciting current remain unchanged while the permanent magnet exciting part also contributes to the excitation, the magnetic flux density in the air gap between the stator and the rotor can be increased to increase the main magnetic flux and the magnetic energy product of the electric motor, thus significantly improving the output and operation efficiency of the electric motor when the belt-driven start/stop mild hybrid system of an automobile operates at a low speed. Hereinafter, two cases where the directions of the two exciting magnetic fluxes are opposite to each other will be described in detail.

Figure 2:
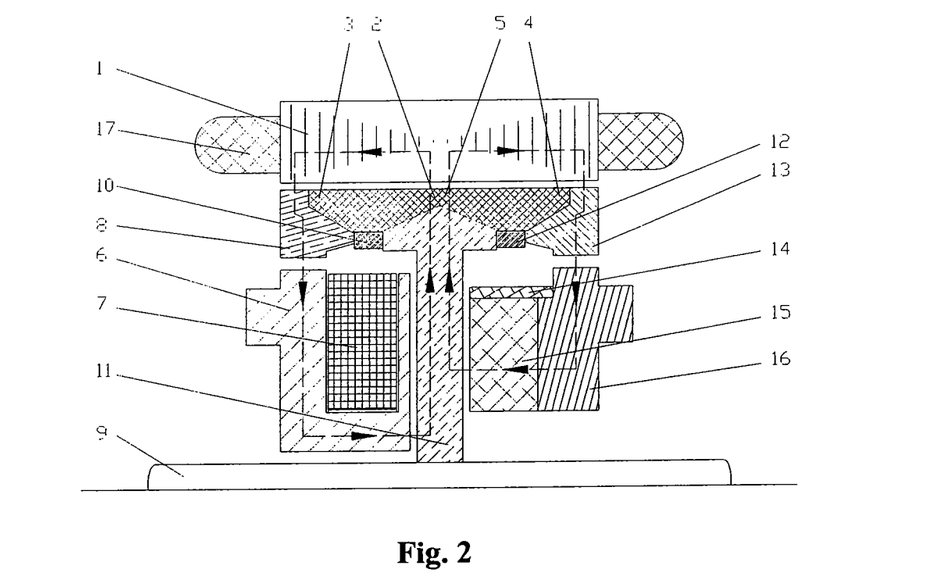
FIG. 2 is a schematic which shows a partially cross-sectional view illustrating a three-dimensional structure of the AC claw-pole electric motor shown in FIG. 1.

As shown in FIG. 2, if the directions of magnetic fluxes of the two exciting magnetic fields face towards each other in the axial direction, the electrically exciting magnetic flux and the permanent magnet exciting magnetic flux flow into the center magnetic yoke 11 via an air gap between the electrically exciting iron core 6 and the center magnetic yoke 11 and an air gap between the annular permanent magnet 15 and the center magnetic yoke 11 respectively, further flow into the first center claw pole 3 and the second center claw pole 4 respectively and flow through the air gap between the rotor and the stator into the stator iron core 1 to form radial magnetic fluxes, and then flow through the air gap between the rotor and the stator back into the first side claw pole 2 and the second side claw pole 5. Finally, the magnetic flux flowing into the first side claw pole 2 flows through the first side magnetic yoke 8 and an air gap between the first side magnetic yoke 8 and the electrically exciting iron core 6 back into the electrically exciting iron core 6; and the magnetic flux flowing into the second side claw pole 5 flows through the second side magnetic yoke 13 and an air gap between the second side magnetic yoke 13 and the permanent magnet exciting iron core 16 into the permanent magnet exciting iron core 16 and further back into the annular permanent magnet 15. Thus, two parallel magnetic circuits are formed.

If the directions of magnetic fluxes of the two exciting magnetic fields face away from each other, flowing directions of the magnetic circuits will be opposite to those described in the previous case. Specifically, magnetic fluxes of the two exciting magnetic fields flow from the center magnetic yoke 11 through the air gap between the electrically exciting iron core 6 and the center magnetic yoke 11 and the air gap between the annular permanent magnet 15 and the center magnetic yoke 11 respectively into the electrically exciting iron core 6 and the permanent magnet exciting iron core 16, and further flow through the air gap between the first side magnetic yoke 8 and the electrically exciting iron core 6 and the air gap between the second side magnetic yoke 13 and the permanent magnet exciting iron core 16 respectively into the first side magnetic yoke 8 and the second side magnetic yoke 13. Then, the magnetic flux flowing into the first side magnetic yoke 8 flows through the air gap between the first side claw pole 2 plus the rotor and the stator into the stator iron core 1; and the magnetic flux flowing into the second side magnetic yoke 13 flows through the air gap between the second side magnetic yoke 5 plus the rotor and the stator into the stator iron core 1. Finally, the magnetic fluxes flow through the first center claw pole 3 and the second center claw pole 4 respectively into the center magnetic yoke 11 to also form two parallel magnetic circuits. In this case, the technical effect is the same as that of the previous case where the directions of magnetic fluxes of the two exciting magnetic fields face towards each other.

Additionally, the electrically exciting part in this embodiment may be connected to a controller (not shown). The controller is configured to control the electrically exciting current of the electrically exciting part and to accomplish the flux-weakening control by controlling an amplitude value of the electrically exciting current so as to achieve the purpose of constant-power speed regulation operation of the electric motor. When the belt-driven start/stop mild hybrid system of an automobile switches from a constant torque region to a constant power region, the electrically exciting current is decreased under the control of the controller so as to extend the range in which the speed of the electric motor can be regulated.

When the AC brushless claw-pole electric motor of this embodiment is in a no-load status (i.e., when there is no electrically excited magnetic field applied in the electric motor), the no-load back electromotive force of the electric motor may be decreased, which will be detailed as follows.

Figure 3:
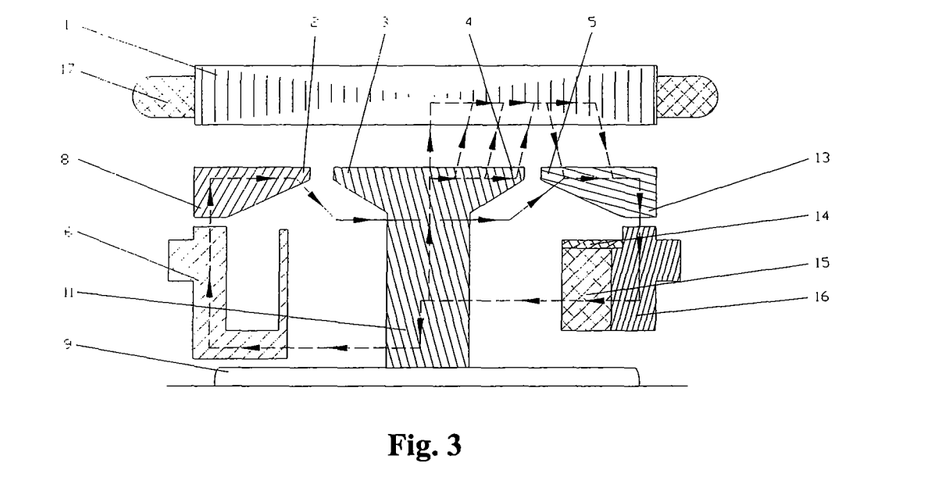
FIG. 3 is a view illustrating magnetic circuits in the AC claw-pole electric motor according to Embodiment 1 of the present invention when there is no electrically excited magnetic field applied.

FIG. 3 is a view illustrating magnetic circuits in the electric motor of Embodiment 1 when there is no electrically excited magnetic field applied.

As shown in FIG. 3, when there is no electrically excited magnetic field applied in the electric motor, the axial magnetic flux of the annular permanent magnet 15 flows through the air gap between the annular permanent magnet 15 and the center magnetic yoke 11 into the center magnetic yoke 11, then flows through the center magnetic yoke 11 to the second center claw pole 4, and further flows through the air gap between the rotor and the stator of the electric motor into the stator iron core 1 to form a radial magnetic flux and to generate a no-load back electromotive force in the three-phase windings 17. The radial magnetic flux formed when the magnetic flux flows into the stator iron core 1 flows through the air gap between the rotor and the stator of the electric motor into the second side claw pole 5. Meanwhile, the magnetic flux flowing into the center magnetic yoke 11 partly flows through the air gap between the center magnetic yoke 11 and the electrically exciting iron core 6 into the electrically exciting iron core 6, then flows through the air gap between the electrically exciting iron core 6 and the first side magnetic yoke 8 into the first side magnetic yoke 8 and then to the first center claw pole 2, and then directly into the second side claw pole 5. The magnetic flux flowing into the second side claw pole 5 flows through the second side magnetic yoke 13, the air gap between the second side magnetic yoke 13 and the permanent magnet exciting iron core 16, and the permanent magnet exciting iron core 16 back to the annular permanent magnet 15 to form the whole closed main magnetic circuit. From the above description, the magnetic flux generated by the permanent magnet is shunted into two paths, one of which is self-closed after passing through relevant parts of the electric motor and the other one of which flows towards the stator iron core and generates the radial magnetic flux; i.e., the magnetic flux of the permanent magnet that generates the radial magnetic flux in the iron core is shunted to decrease the no-load back electromotive force of the electric motor. If the axial magnetic flux of the permanent magnet is opposite in direction, the flowing direction of the magnetic circuit will be the opposite to what has been described above, and this can also decrease the no-load back electromotive force of the electric motor.

Figure 4:
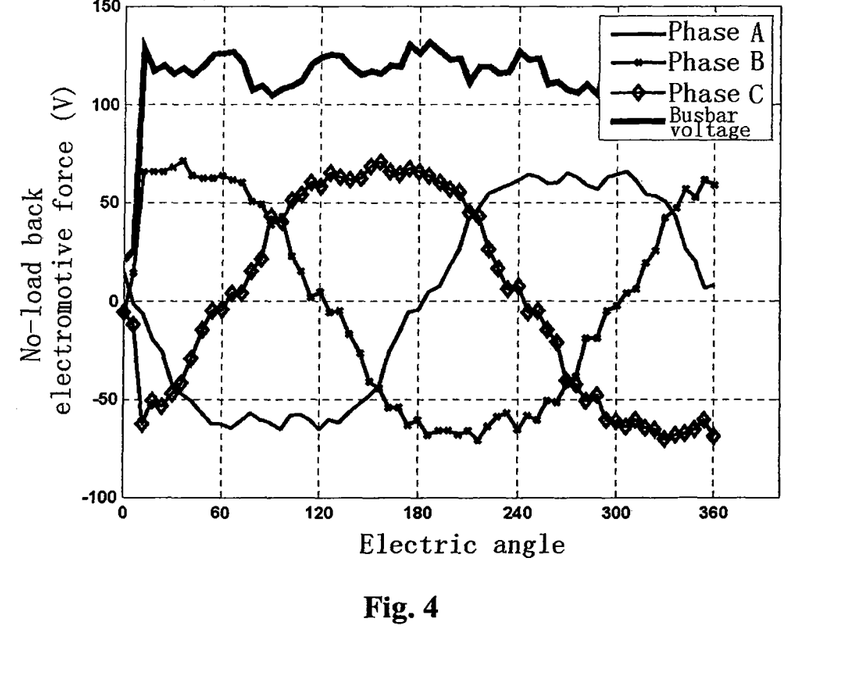
FIG. 4 is a waveform diagram illustrating three-phase no-load back electromotive forces of the AC claw-pole electric motor according to Embodiment 1 of the present invention when there is no electrically excited magnetic field applied and under a temperature of 20° C. and a rotation rate of 16000 rpm, as well as a direct current (DC) busbar voltage in the belt-driven start/stop mild hybrid system of an automobile.

FIG. 4 is a waveform diagram illustrating three-phase no-load back electromotive forces of the hybrid-excitation AC brushless claw-pole electric motor according to Embodiment 1 of the present invention when there is no electrically excited magnetic field applied and under a temperature of 20° C. and a rotation rate of 16000 rpm, as well as a direct current (DC) busbar voltage in the belt-driven start/stop mild hybrid system of an automobile.

As can be seen from FIG. 4, the three-phase no-load back electromotive forces of the hybrid-excitation AC brushless claw-pole electric motor according to Embodiment 1 of the present invention when there is no electrically excited magnetic field applied and under a temperature of 20° C. and a rotation rate of 16000 rpm have a peak value of about 130V, which is much lower than the no-load back electromotive forces of prior permanent magnet electric motors. Consequently, the voltage rating of the inverter for the electric motor in the belt-driven start/stop mild hybrid system of an automobile gets lowered and the impact on the DC busbar voltage at high speeds is reduced.

Embodiment 2

This embodiment differs from Embodiment 1 in that, the two exciting parts in the AC brushless claw-pole electric motor of this embodiment are both permanent magnet exciting parts, and other structures are all similar to those of Embodiment 1 and will not be described again herein.

Figure 5:
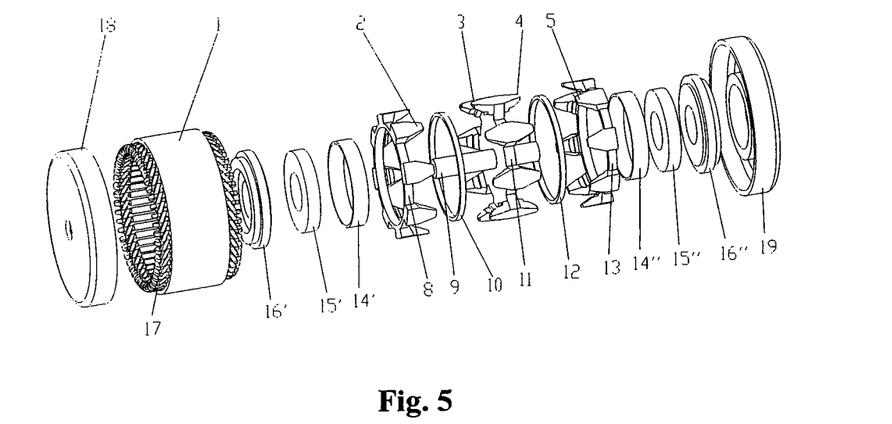
FIG. 5 is a schematic showing the exploded structural view of an AC claw-pole electric motor according to Embodiment 2 of the present invention.

FIG. 5 is a schematic showing the exploded structural view of an AC brushless claw-pole electric motor according to Embodiment 2 of the present invention. In FIG. 5, reference numerals 16', 16" represent permanent magnet exciting iron cores, and reference numerals 15', 15" represent annular permanent magnets. The permanent magnet exciting iron core 16' is joined with the end cover 18 of the casing, and the annular permanent magnet 15' is joined with the permanent magnet exciting iron core 16'. The annular permanent magnet 15' is accommodated in a space formed by the center magnetic yoke 11, the first side magnetic yoke 8, the first side claw pole 2 and the first center claw pole 3. The permanent magnet exciting iron core 16" is joined with an end cover 19, and the annular permanent magnet 15" is joined with the permanent magnet exciting iron core 16". The annular permanent magnet 15" is accommodated in a space formed by the center magnetic yoke 11, the second side magnetic yoke 13, the second center claw pole 4 and the second side claw pole 5. This leads to a compact spatial arrangement and a high space utilization rate, and allows for increasing the effective length of the stator iron core of the electric motor; meanwhile, the two permanent magnets are both located away from the stator section to reduce the risk of demagnetization of the permanent magnet, so the thermal stability of the electric motor is improved.

Additionally, stainless steel sleeves 14', 14" may sheathe the permanent magnet exciting parts by being embedded into the permanent magnet exciting iron cores 16', 16" and abutting against outer peripheries of the annular permanent magnets 15', 15". The stainless steel sleeves 14', 14" are used to secure the annular permanent magnets 15', 15" against falling off of the annular permanent magnets 15', 15", which can further ease requirements on mechanical strength of the permanent magnets.

Figure 6:
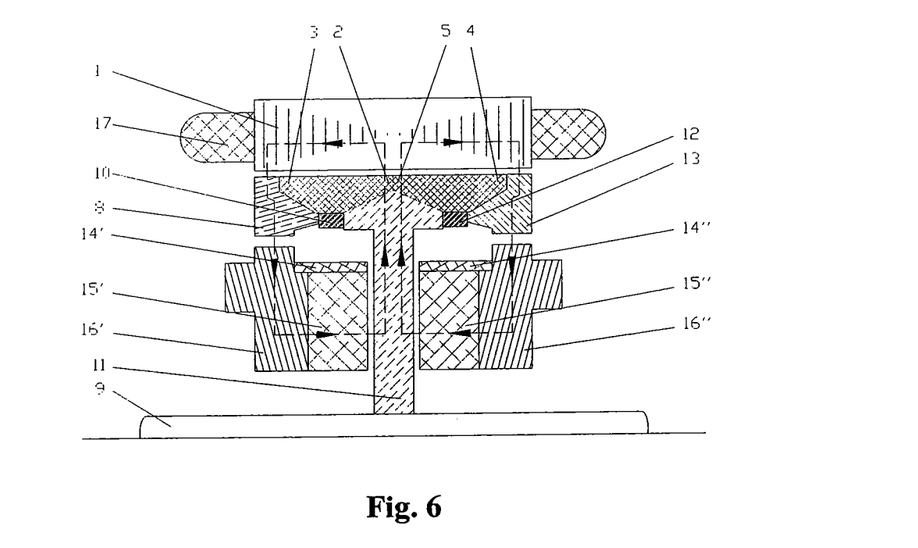
FIG. 6 is a schematic which shows a partially cross-sectional view illustrating a three-dimensional structure of the AC claw-pole electric motor shown in FIG. 5.

The main magnetic flux loop of the AC brushless claw-pole electric motor of this embodiment is generated by the two magnetic fields of permanent magnets together. The directions of Magnetic fluxes generated by the two permanent magnet exciting parts are opposite to each other, and the magnetic fluxes flow respectively through the air gaps, the rotor and the stator et al. to form two parallel magnetic circuits. As shown in FIG. 6, magnetic fluxes of the two permanent magnet exciting magnetic fields flow through an air gap between the annular permanent magnet 15' and the center magnetic yoke 11 and an air gap between the annular permanent magnet 15" and the center magnetic yoke 11 respectively into the center magnetic yoke 11, then flow into the first center claw pole 3 and the second center claw pole 4 respectively and flow through the air gap between the rotor and the stator into the stator iron core 1 to form radial magnetic fluxes, and further flow through the air gap between the rotor and the stator back into the first side claw pole 2 and the second side claw pole 5 respectively. Finally, the magnetic flux flowing into the first side claw pole 2 flows through the first side magnetic yoke 8 and an air gap between the first side magnetic yoke 8 and the permanent magnet exciting iron core 16' back into the permanent magnet exciting iron core 16'; and the magnetic flux flowing into the second side claw pole 5 flows through the second side magnetic yoke 13 and an air gap between the second side magnetic yoke 13 and the permanent magnet exciting iron core 16" back into the permanent magnet exciting iron core 16". Thus, two parallel magnetic circuits are formed. In the AC brushless claw-pole electric motor according to this embodiment of the present invention, the main magnetic flux is generated by the two magnetic fields of permanent magnets together, so the main magnetic flux of the electric motor is increased and the output and operation efficiency of the electric motor when the belt-driven start/stop mild hybrid system of an automobile operates at a low speed are significantly improved.

Embodiment 3

This embodiment differs from Embodiment 1 in that the AC claw-pole electric motor of this embodiment is of a brush-type hybrid excitation structure, and both the electrically exciting part and the permanent magnet exciting part of this embodiment are fixed to the rotor and a brush and slip ring system (not shown) is needed.

Figure 7:
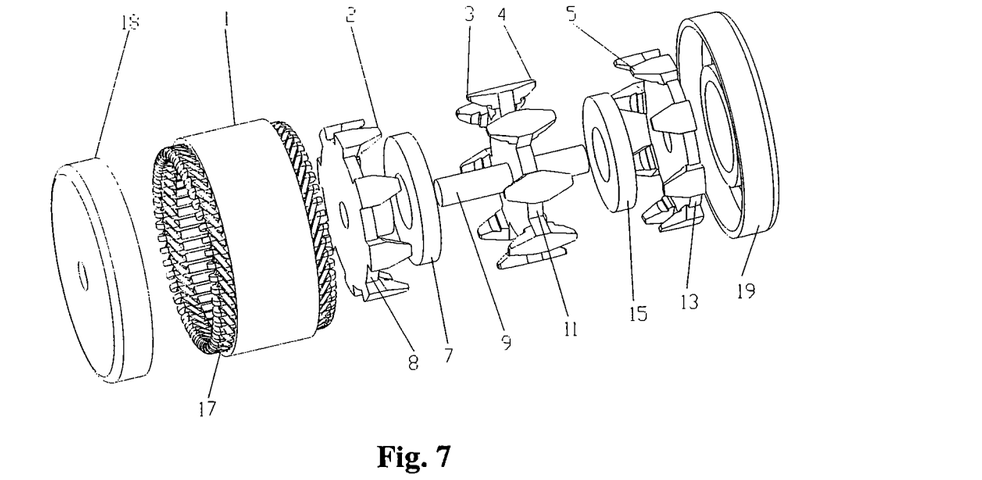
FIG. 7 is a schematic showing the exploded structural view of an AC claw-pole electric motor according to Embodiment 3 of the present invention.
Figure 8:
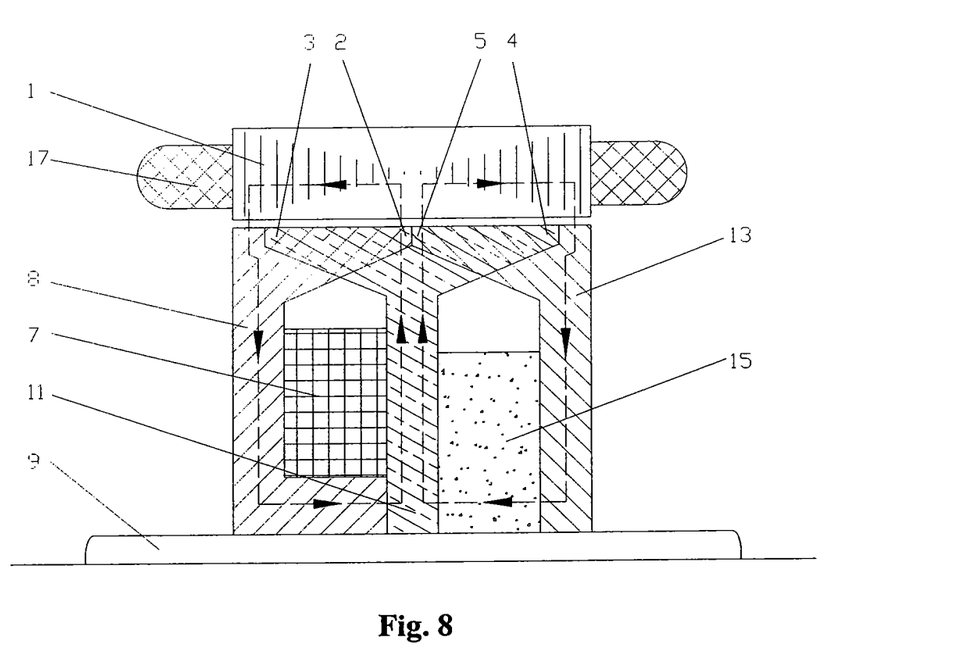
FIG. 8 is a schematic which shows a partially cross-sectional view illustrating a three-dimensional structure of the AC claw-pole electric motor shown in FIG. 7.
Figure 11:
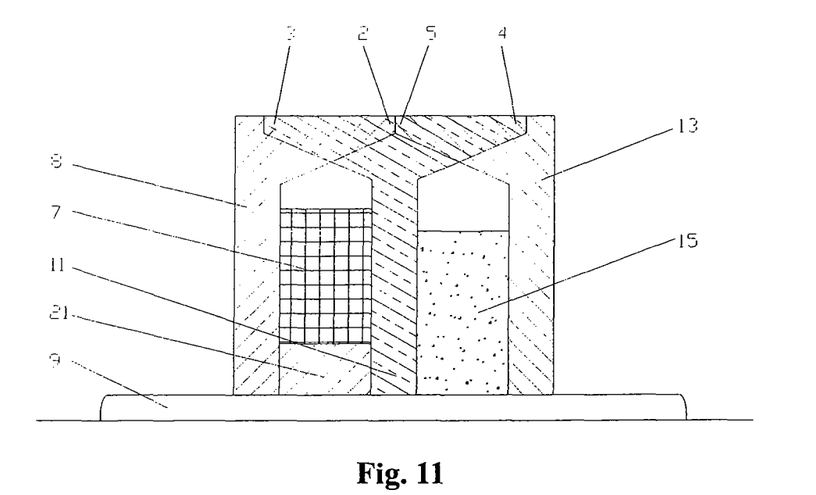
FIG. 11 is a cross-sectional view of a further fixing structure for the electrically exciting part and the permanent magnet exciting part according to Embodiment 3 of the present invention.

FIG. 7 is a schematic showing the exploded structural view of an AC claw-pole electric motor according to Embodiment 3 of the present invention, and FIG. 8 is a schematic which shows a partially cross-sectional view illustrating a three-dimensional structure of the AC claw-pole electric motor shown in FIG. 7. As shown in FIG. 7, the center magnetic yoke 11, the first side magnetic yoke 8 and the second side magnetic yoke 13 are all of a round-disc form in this embodiment. The first side magnetic yoke 8 contacts closely with the center magnetic yoke 11, and the electrically exciting winding 7 is located between the first side magnetic yoke 8 and the center magnetic yoke 11; the annular permanent magnet 15 is located between the center magnetic yoke 11 and the second side magnetic yoke 13, and contacts closely with the center magnetic yoke 11 and the second side magnetic yoke 13. On the first side magnetic yoke 8, an annular structure protruding towards the center magnetic yoke 11 needs to be located for use as an exciting iron core of the electrically exciting winding 7 so that the electrically exciting winding 7 can be wound thereon; meanwhile, this structure is also a flow path for magnetic flux generated by the electrically exciting winding 7. Alternatively, this structure may also be separated for use as a separate iron core part 21 of the electrically exciting winding, as shown in FIG. 11. The center magnetic yoke 11, the first side magnetic yoke 8 and the second side magnetic yoke 13 are all fixed on the rotor shaft 9 in such a way that the annular permanent magnet 15 contacts closely with the center magnetic yoke 11 and the first side magnetic yoke 8 contacts closely with the second side magnetic yoke 13. There are no air gaps in between to ensure an adequate magnetic flux of the main magnetic circuit. Thus, the electrically exciting winding 7 and the annular permanent magnet 15 are fixed on the rotor to rotate together with the rotor. Other structures are all similar to those of Embodiment 1 and, thus, will not be described again herein.

The main magnetic flux of the AC brush claw-pole electric motor of this embodiment is also generated by an electrically exciting magnetic field and a magnetic field of permanent magnet together. The directions of magnetic fluxes generated by the electrically exciting part and the permanent magnet exciting part are opposite in the axial direction, and the magnetic fluxes flow through the rotor and the stator et al. of the electric motor to form two parallel magnetic circuits.

As shown in FIG. 8, the electrically exciting magnetic flux and the permanent magnet exciting magnetic flux flow into the center magnetic yoke 11 while facing toward each other along the axial direction, further flow through the first center claw pole 3 and the second center claw pole 4 into the stator iron core 1 to form radial magnetic fluxes, and then flow back into the first side claw pole 2 and the second side claw pole 5 respectively. Finally, the magnetic fluxes flow through the first side magnetic yoke 8 and the second side magnetic yoke 13 respectively into the center magnetic yoke 11 to form two parallel magnetic circuits. In case the directions of the magnetic fluxes of the two exciting magnetic fields face away from each other in the axial direction, the flow directions of the magnetic circuits will be opposite to the above flow direction. This embodiment can also achieve the same effect as those of Embodiment 1 and Embodiment 2.

When the AC brush claw-pole electric motor of this embodiment is in a no-load status (i.e., when there is no electrically excited magnetic field applied in the electric motor), the no-load back electromotive force of the electric motor may also be decreased as described in Embodiment 1, so no description will be made again herein.

Figure 9:
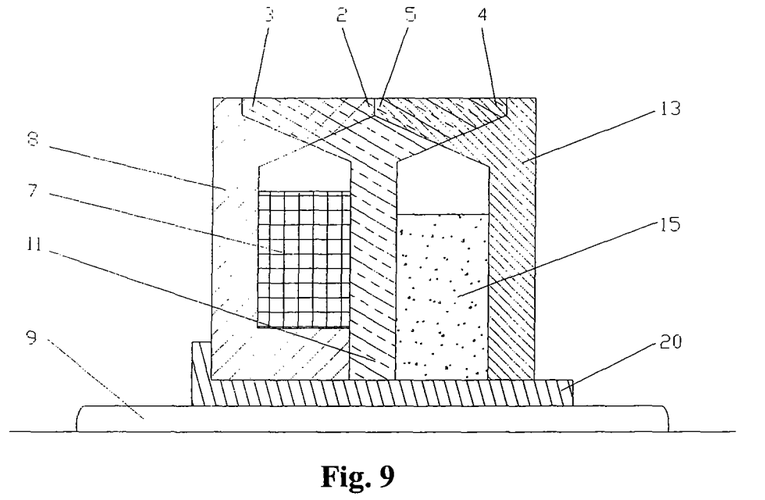
FIG. 9 is a cross-sectional view of a fixing structure for the electrically exciting part and the permanent magnet exciting part according to Embodiment 3 of the present invention.
Figure 10:
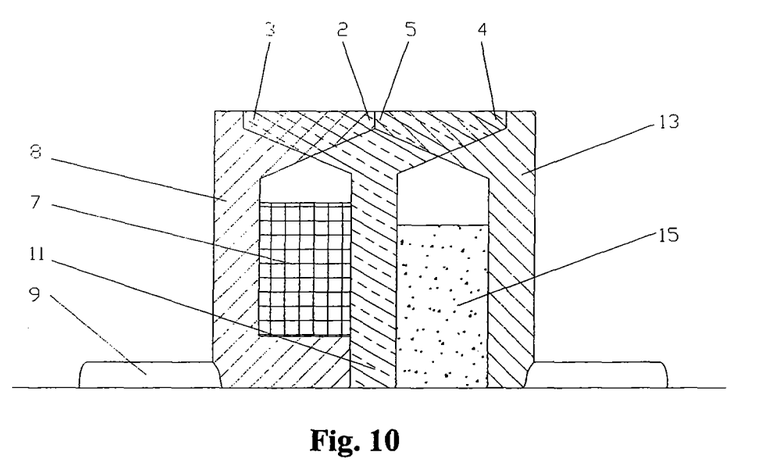
FIG. 10 is a cross-sectional view of another fixing structure for the electrically exciting part and the permanent magnet exciting part according to Embodiment 3 of the present invention.

To avoid shunting of the magnetic path, the rotor shaft 9 shall be made of non-magnetic steel. If the rotor shaft 9 is provided with a ring 20 made of a non-magnetic material (e.g., brass or non-magnetically permeable stainless steel), then the rotor shaft 9 may be made of magnetic steel, as shown in FIG. 9. Additionally, the rotor structure may be a solid permanent magnet without having an axial bore, and the first side magnetic yoke 8 and the second side magnetic yoke 13 may also be solid; then, the electrically exciting winding 7 and the annular permanent magnet 15 may be located between the three magnetic yokes, and the rotor shaft 9 is welded at both sides to the first side magnetic yoke 8 and the second side magnetic yoke 13 respectively, as shown in FIG. 10.

Additionally, the electrically exciting part in this embodiment may be connected to a controller (not shown). The controller is configured to control the electrically exciting current of the electrically exciting part and to accomplish the flux-weakening control by controlling an amplitude value of the electrically exciting current so as to achieve the purpose of constant-power speed regulation operation of the electric motor; this can prevent the problem of having to increase the direct axis current in order to accomplish the flux-weakening speed regulation as in the control of pure permanent magnet electric motors, and can reduce the current rating of the power electronic inverter. When the belt-driven start/stop mild hybrid system of an automobile switches from a constant torque region to a constant power region, the electrically exciting current is decreased under the control of the controller so as to extend the range in which the speed of the motor can be regulated.

The AC brush claw-pole motor of this embodiment has a strong structure and desirable mechanical characteristics, and excludes existence of a plurality of air gaps between the stator and the rotor, so the main magnetic flux in the magnetic circuits is greater than those of Embodiment 1 and Embodiment 2. Accordingly, the performance of the electric motor is better under the same excitation conditions.

Additionally, in the AC claw-pole electric motors according to the aforesaid embodiments of the present invention, the permanent magnet exciting parts are all located at a side of the center magnetic yoke with a distance from the stator section being larger than that of the prior art, so the heat generated by the stator section has less impact on the permanent magnet. This reduces the risk of demagnetization of the permanent magnet, thus improving the thermal stability of the electric motor. Moreover, the permanent magnet features a simple structure, superior magnetic properties, uniform magnetization and a high utilization degree. Furthermore, the permanent magnet may be encased by a non-magnetically permeable sleeve to further ease the requirements on mechanical strength of the permanent magnet.

In the AC claw-pole electric motors according to Embodiment 1 and Embodiment 3 of the present invention, the magnetic flux generated by the permanent magnet is shunted into two paths when there is no electrically excited magnetic field applied in the electric motor, one of which is self-closed after passing through relevant parts of the electric motor and the other of which flows towards the stator iron core and generates a radial magnetic flux, i.e., the magnetic flux of the permanent magnet that generates the radial magnetic flux in the iron core is shunted so as to decrease the no-load back electromotive force of the electric motor and ease the volt-ampere requirements on power electronic controllers in the belt-driven start/stop mild hybrid system of an automobile.

The present invention provide a new topology of AC claw-pole electric motors, which is particularly suitable for integrated unit BSG electric motors used to perform the function of quickly starting/stopping and power generation of a motor of an automobile in an automobile hybrid power system, and is also suitable for other driving or power generating situations where speed regulation is required.

So far, embodiments of the AC claw-pole electric motor of the present invention have been described by way of example; however, the present invention is not merely limited thereto. For example, the permanent magnet structure may also be of other structural forms that present an axial magnetic flux opposite to the electrically exciting magnetic flux.

Additionally, in Embodiment 1 and Embodiment 2 of the present invention described above, connection between the first center claw pole and the first side claw pole and connection between the second center claw pole and the second side claw pole are both accomplished through welding by means of a non-magnetically permeable ring. However, the way of connecting these claw poles is not limited thereto; rather, they may also be connected together by use of screws, dovetail grooves or the like.

Furthermore, in the aforesaid embodiments of the present invention, a non-magnetically permeable sleeve is located outside the annular permanent magnet; however, the non-magnetically permeable sleeve may also be omitted depending on operation environments of the electric motor.

Additionally, as in Embodiment 3, the rotor shaft 9 in Embodiment 1 and Embodiment 2 shall also be made of non-magnetic steel to avoid shunting of the magnetic path. If the rotor shaft 9 is sheathed with a ring 20 made of a non-magnetic material (e.g., brass or non-magnetically permeable stainless steel), then the rotor shaft 9 may be made of magnetic steel.

Also, in the aforesaid embodiments of the present invention, a stainless steel ring, a stainless steel rotor shaft and a stainless steel sleeve are used. However, these elements are not limited to be made of stainless steel, but may also be made of other non-magnetically permeable materials having desirable mechanical characteristics.

The aforesaid embodiments of the present invention are only provided as examples but are not intended to limit the scope of the present invention. The scope of the present invention shall be governed by the claims.

The invention claimed is:

1. An alternating current claw-pole electric motor, comprising:
   a casing;
   a stator connected with the casing;
   a rotor and two exciting parts, the rotor including a rotor shaft, a center magnetic yoke, a first side magnetic yoke, a second side magnetic yoke, center claw poles provided on the center magnetic yoke, a first side claw pole provided on the first side magnetic yoke, and a second side claw pole provided the second side magnetic yoke;
   a first stainless ring welded to a first center claw pole and the first side claw pole such that the first center claw pole and the first side claw pole are adjacently and alternately combined together; and
   a second stainless ring welded to a second center claw pole and the second side claw pole such that the second center claw pole and the second side claw pole are adjacently and alternately combined together;
   wherein:
   the two exciting parts are respectively provided in a first space formed by the center magnetic yoke, the first side magnetic yoke, the first center claw pole and the first side claw pole and a second space formed by the center magnetic yoke, the second side magnetic yoke, the second center claw pole and the second side claw pole, and axial exciting magnetic fluxes of the two exciting parts are opposite in direction;
   a first of the two exciting parts is a permanent magnet exciting part fixed to the casing and a second of the two exciting parts is an electrically exciting part; and
   the rotor shaft, the center magnetic yoke, the first side magnetic yoke, the second side magnetic yoke, the center claw poles, the first side claw pole, the second side claw pole and the first and second stainless rings are connected together to form a whole claw-pole rotor.

2. The alternating current claw-pole electric motor according to claim 1, wherein the electrically exciting part is fixed to the casing.

3. The alternating current claw-pole electric motor according to claim 2, further comprising:
   a non-magnetically permeable sleeve abutting against an outer periphery of the permanent magnet exciting part.

4. The alternating current claw-pole electric motor according to claim 1, wherein at least one of the exciting parts is connected with a controller for controlling an exciting current of the electrically exciting part.

5. The alternating current claw-pole electric motor according to claim 1, wherein at least one of the exciting parts is connected with a controller for controlling an exciting current of the electrically exciting part and wherein the controller is configured to decrease the exciting current of the electrically exciting part when the alternating current claw-pole electric motor switches from a constant torque region to a constant power region.

* * * * *